June 1, 1965  W. G. PFANN  3,186,217
PIEZORESISTIVE STRESS TRANSDUCER
Filed Dec. 2, 1960

INVENTOR
W. G. PFANN
BY
ATTORNEY 3,186,217
PIEZORESISTIVE STRESS TRANSDUCER
William G. Pfann, Far Hills, N.J., assignor to Bell Telephone Laboratories, Incorporated, New York, N.Y., a corporation of New York
Filed Dec. 2, 1960, Ser. No. 73,313
16 Claims. (Cl. 73—88.5)

This invention relates to novel piezoresistive semiconducting stress and strain gages. More particularly, it utilizes a phenomenon found in many semiconducting materials according to which these materials exhibit variations in piezoresistive or elastoresistive coefficients dependent upon crystallographic orientation and upon whether the impurity in the crystal is such as to make it an n-type or p-type semiconductor.

In contrast with metal-wire or metal-foil bonded strain gages, or to earlier types of semiconductive strain gages in the form of thin rods, all of which are insensitive to transverse strains in that such strains are not effectively transmitted to the active material, the gages of this invention are extremely sensitive to transverse strains or stresses and, in fact, are specially designed to take advantage of such transverse strains or stresses. By utilizing transverse effects, as well as differences in longitudinal effects between semiconductors of differing impurity content, various gage constructions are described which are capable of providing gage factors in excess of two and one-half times those of conventional piezoresistive gages. The devices of this invention are additionally inherently compensated against variations in gage readings produced by fluctuations in hydrostatic pressure or by differential thermal expansion between the gage material and the material to which the gage is affixed and also to variations in resistance of the gage arms due to Joule heating.

The relative resistance change of a gage arm when a simple tension or compression is applied parallel or transverse to the current direction can be described in terms of stress or of strain. The longitudinal piezoresistance constant, $\pi_1$, is defined by Equation 1:

$$\pi_1 = \frac{\Delta R/R_0}{\sigma_1} \quad (1)$$

where $\pi_1$ is the stress in dynes per cm.$^2$, $R_0$ is the original resistance in ohms, $\Delta R$ is the resistance change in ohms, and $\sigma_1$ is in units of cm.$^2$ per dyne. In this case, the stress and the current are both in the longitudinal direction. The transverse piezoresistance constant, $\pi_t$, is defined by Equation 2:

$$\pi_t = \frac{\Delta R/R_0}{\sigma_t} \quad (2)$$

where $\sigma_t$ is the stress in the transverse direction (normal to the longitudinal direction), while the resistance change is measured in the longitudinal direction.

The longitudinal elastoresistance constant, $m_1$, is defined for a simple longitudinal tension by Equation 3:

$$m_1 = \frac{\Delta R/R_0}{\epsilon_1} \quad (3)$$

where $\epsilon_1$ is the longitudinal strain produced by the longitudinal tensile stress.

The transverse elastoresistance constant $m_t$ is defined by Equation 4:

$$m_t = \frac{\Delta R/R_0}{\epsilon_t} \quad (4)$$

where $\epsilon_t$ is the transverse strain produced by a simple transverse tension.

The relations between $m_1$, $m_t$ and $\pi_1$, $\pi_t$ are:

$$m_1 = \pi_1 Y_1 \quad (5)$$
$$m_t = \pi_t Y_t \quad (6)$$

where $Y_1$ and $Y_t$ denote the values of Young's modulus in the $l$- and $t$-direction, respectively.

The values of $\pi_1$ and $\pi_t$ depend on the direction in the crystal. For crystals of the diamond cubic or zincblende structure, $\pi_1$ is given by:

$$\pi_1 = \pi_{11} + 2(\pi_{44} = \pi_{12} - \pi_{11})(l^2m^2 + l^2n^2 + m^2n^2) \quad (7)$$

and $\pi_t$ is given by:

$$\pi_t = \pi_{12}(l_2{}^2m_1{}^2 + l_1{}^2m_2{}^2 + l_2{}^2n_1{}^2 + l_1{}^2n_2{}^2 + m_2{}^2n_1{}^2 + m_1{}^2n_2{}^2) \\ + 2(\pi_{44} - \pi_{11})(l_1l_2m_1m_2 - l_1l_2n_1n_2 + m_1m_2n_1n_2) \quad (8)$$

where $l$, $m$, and $n$ are direction cosines of the current direction with respect to the crystallographic axes, and $\pi_{11}$, $\pi_{12}$, and $\pi_{44}$ are the fundamental piezoresistive constants.

In Equations 1 to 4 the effects of dimensional changes on $\Delta R$ have been neglected. In the semiconducting gages of this invention, these effects are negligibly small compared to the values of $\pi$ or $m$ which can be regarded as the gage factors for stress or strain, respectively. The gages of this invention are most conveniently regarded as stress gages and their ability to measure stresses is one of their advantages as compared with wire or foil-type metal gages. By stress, we mean the stress in the gage resulting from the stress in the body to which the gage may be bonded. This stress is equal to the stress in the body times the ratio of Young's modulus for the gage material to Young's modulus for the material of the body.

The piezoresistance constants for certain semiconductors are opposite in sign for different crystallographic orientations. The constants can also be opposite in sign for semiconductors of the same orientation but opposite conductivity-type. Thus, for a given directional strain, the voltage change responsive to the piezoresistive effect can be made to be opposite in two members of the same material provided the strain has a component parallel to the proper crystallographic direction in each member. In the same manner, since these crystallographic directions are in many instances normal to one another, a single piece of semiconductor can be chosen to have a longitudinal piezoresistive coefficient, $\pi_1$, which is opposite in sign to its transverse piezoresistive constant, $\pi_t$. The gage constructions and configurations of this invention as hereinafter defined all utilize extreme variations between the values of the transverse and longitudinal piezoresistive coefficients in combination with a Wheatstone bridge circuit. A most significant feature of this combination is that negative and positive variations in resistance with the strain to be measured are well adapted to be combined to show an additive overall effect while retaining an overall gage insensitivity to ambient temperature, hydrostatic pressure variations, Joule heating effects and additionally, to errors in gage readings introduced through differential thermal expansion between the gage material and the body to which the gage is affixed.

This invention in its broadest aspects proposes the use of two active gage members possessing opposite piezoresistive coefficients such that a given directional strain produces a piezoresistive effect which, due to the opposite signs of the piezoresistive coefficients, provides opposing voltage directionality in each member. The opposing piezoresistive effects, when appropriately measured by a Wheatstone bridge circuit, will record the difference between the two voltages and hence, the combined additive effect. Since each of these opposite resistance effects are measured in Wheatstone bridge arms, which subtract voltages rather than add voltages, the overall gage is insensitive to any influence, aside from the desired piezoresistive effects, which affects the resistance of each arm in the same manner. Consequently, equal variations in the resistivity of the arms due to temperature or pressure variations, or thermal expansion or contraction differential to that of the material in which the strain is to be measured, will not be reflected in the gage reading. To obtain equal variations in the resistance of the arms responsive to these effects, the thermal expansion coefficients, thermal resistivity coefficients, and elastic moduli of the materials of the arms should be approximately matched. To this end, it is preferable to construct each arm of the same material. Some applications may require a control over only one of these variables. Accordingly, in such cases only that property responsible for the variable to be controlled need be matched in the arms.

The following table contains various examples of the semiconductor materials which exhibit transverse piezoresistive coefficients which are opposite to the longitudinal piezoresistive coefficient and the proper crystallographic orientation to give this result.

*Table I*

| Example | Material | Plane of gage | Direction of arm 1 | Direction of arm 2 |
|---------|----------|---------------|--------------------|--------------------|
| 1 | n-Silicon | 001 | 100 | 010 |
| 2 | ___do___ | 110 | 001 | $1\bar{1}0$ |
| 3 | n- or p-Germanium | 100 | 110 | $1\bar{1}0$ |
| 4 | ___do___ | 111 | $1\bar{1}0$ | $11\bar{2}$ |
| 5 | ___do___ | $11\bar{2}$ | 111 | $1\bar{1}0$ |
| 6 | ___do___ | $1\bar{1}0$ | 111 | $11\bar{2}$ |
| 7 | p-Silicon | 111 | $1\bar{1}0$ | $11\bar{2}$ |
| 8 | ___do___ | $1\bar{1}0$ | 111 | $11\bar{2}$ |
| 9 | ___do___ | 100 | 110 | $1\bar{1}0$ |
| 10 | ___do___ | $11\bar{2}$ | 111 | $1\bar{1}0$ |
| 11 | n-GaSb | 100 | 110 | $1\bar{1}0$ |
| 12 | n-GaSb | $11\bar{2}$ | 111 | $1\bar{1}0$ |
| 13 | n-InSb | 001 | 100 | 010 |
| 14 | p-PbTe | $11\bar{2}$ | 111 | $1\bar{1}0$ |
| 15 | p-PbTe | 100 | 110 | $1\bar{1}0$ |

Some exemplary devices and configurations and various specific materials and crystallographic orientations, appropriate for their construction with a few applications for their use, all using the principles as above set forth, are hereinafter defined and are better understood when considered in conjunction with the drawing in which.

Figure 1:
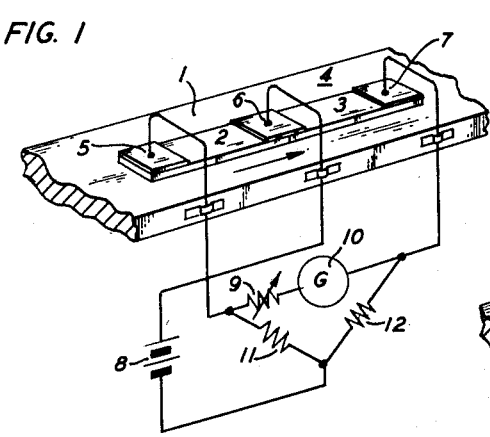
FIG. 1 is a perspective view of a typical stress gage utilizing two active arms constructed according to the broadest features of this invention.

FIG. 1 shows a gage constructed according to the broadest aspects of this invention. The gage indicated generally at 1 is composed of two active arms 2 and 3 which are affixed to the member 4 in which strains are to be measured by glue or other appropriate means. Contacts 5, 6 and 7 are made to each end of the two arms, contact 6 here being common to both. Alternatively, the gage arms 2 and 3 may be separated and disposed end to end or side by side thus necessitating an additional contact. These two active arms are then connected in a Wheatstone bridge circuit, as shown, which includes power source 8, variable resistor 9, galvanometer 10, and fixed dummy resistors 11 and 12, all of which are conventional elements of common bridge circuits as known in the art. The variation in voltage due to piezoresistive effects in arms 2 and 3 responsive to strains in the direction of the arrow as indicated can be measured directly on the galvanometer 10 or may be read from calibrations on variable resistor 9 as a zero potential is re-established on the galvanometer.

The arms 2 and 3 must be so chosen that the piezoresistive constants in each arm which dictate the piezoresistive effect for unidirectional strains, such as that indicated by the arrow, are opposite in sign to one another. Thus, the arms show opposite voltages responsive to such strains which are additive in the bridge circuit as shown. Appropriate crystallographic orientations for two separate semiconductor strips showing opposite coefficients may be as follows:

Arm 2: n-type germanium, resistivity ~1 ohm-cm.
Arm 3: p-type germanium, resistivity ~1 ohm-cm.
[111] direction parallel to stress direction in both arms.

It is apparent that the principles of this invention as applied to the embodiment of FIG. 1 may be extended to encompass two such constructions as appearing in FIG. 1, thus providing four active arms, the added two arms being inserted in place of the otherwise passive resistors 11 and 12. In this event the added arm, having a coefficient corresponding to that of arm 2, occupies the site of resistor 12 and the added arm corresponding to arm 3 occupies the place of resistor 11. In this manner a full Wheatstone bridge is obtained wherein each arm contributes a piezoresistive effect and all four arms are additive.

Since certain semiconductors exhibit piezoresistive coefficients which are opposite in a sign for n-type and p-type doping, a single crystal of such a semiconductor may be employed according to the teachings of this invention to provide the same advantages as found in the gage of FIG. 1. Thus the gage of FIG. 1 shown as two separate strips can be a single crystal of germanium, for instance, having one-half p-type and the remaining half n-type. The p and n sides of the semiconductor may be disposed in two ways, either with the junction across the transverse dimension similar to FIG. 1 or with the junction extending in a longitudinal direction. The same configuration as that given in the previous paragraph is appropriate for this modification also since the semiconductor material is the same for each arm. This embodiment allows one to take full advantage of the longitudinal coefficient in each arm since the longitudinal coefficient is typically the largest obtainable in a given crystal.

Figure 2:
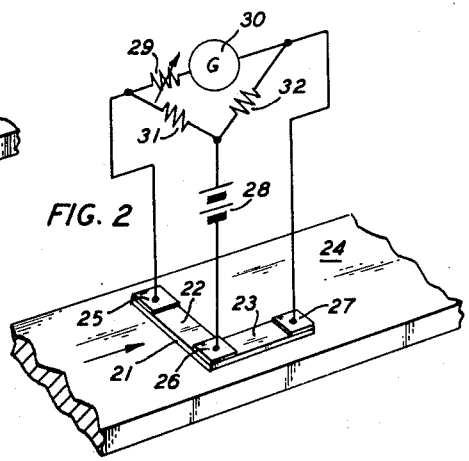
FIG. 2 is a perspective view of a stress gage similar to that of FIG. 1 but having both arms constructed of a single semiconductor crystal.

FIG. 2 shows a different approach to a single crystal gage with two active arms very similar in construction and purpose to that of FIG. 1. The gage indicated generally at 21 comprises active arms 22 and 23 and is affixed to base material 24 in which strains are to be measured. Contacts 25, 26 and 27 are made to the gage and connected in the bridge circuit as shown. The bridge elements 28, 29, 30, 31 and 32 assume the same functions as the corresponding members of FIG. 1. The significant difference between this gage and that of FIG. 1 is that it may be constructed of a single crystal. Also, the directions of current flow in the two arms are non-parallel, whereas they are parallel in the modification of FIG. 1. In other words, in the gage of FIG. 2 one arm utilizes a transverse piezoresistive coefficient while the other arm makes use of a longitudinal piezoresistive coefficient. Arms 22 and 23 are chosen such that the longitudinal piezoresistive constant of arm 23 is opposite in sign to the transverse piezoresistive coefficient of arm 22. It will be appreciated that the transverse coefficient $\pi_t$ must be utilized in one of the arms whereas the gage of FIG. 1 can employ two longitudinal coefficients, of different materials if desired. All of the orientations appearing in Table I are useful in this embodiment, the designated arms 1 and 2 corresponding here to arms 22 and 23.

Again, as in FIG. 1, a full bridge gage may be employed by combining two such gages as that of FIG. 2. The added arm, having the coefficient of the same sign as arm 22, assumes the position of resistor 32, the other added arm takes the position of resistor 31.

A further alternative is to combine the gages of FIGS. 1 and 2 to obtain a full bridge gage with four active arms. The advantages of four active arms will be more thoroughly pointed out in connection with FIG. 4, a preferred embodiment employing four active arms of a single semiconductor crystal.

Figure 3:
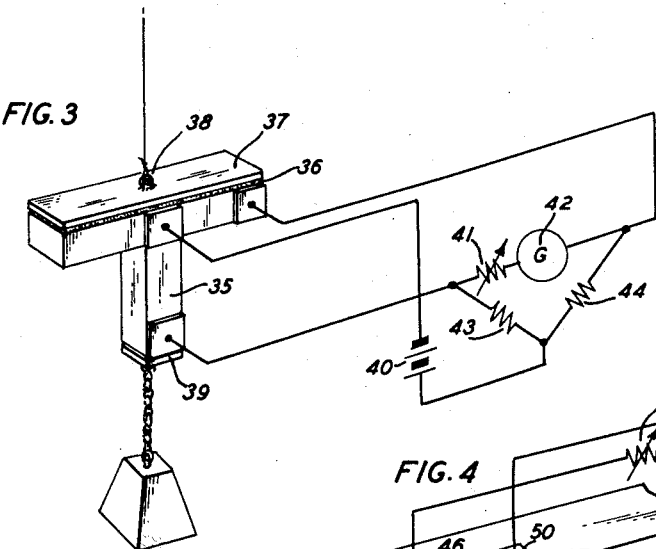
FIG. 3 is a perspective view of a gage similar to that of FIG. 2 showing its use in measuring tensions directly, as in a weight balance.

FIG. 3 shows a gage having essentially the construction shown in FIG. 2 illustrating the adaptability of these gage types to measuring tensile (or compressive) stresses directly in a manner similar to a spring balance. The gage, 35, is identical to the gage of FIG. 2 except the inactive arm forming the remainder of the T portion is included to obtain the necessary symmetry around the two points of strain. The upper portion of the T is affixed to bar 37 carrying eyelet 38 by glue 36 or other appropriate means. The lower arm of the gage carries another eye 39. Attached to each of these eyes are any desired tensile members in which strains are to be measured or, a weight, as shown, may be hung from one end the other end being fixed whereby its conventional weight is determined by the resulting stress in the gage 35. Again, bridge elements 40, 41, 42, 43 and 44 are included as shown.

Figure 4:
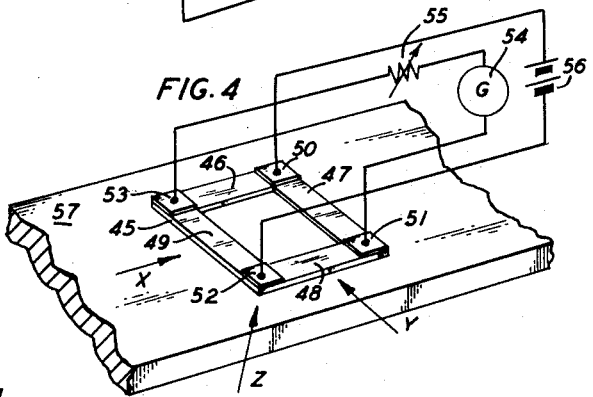
FIG. 4 is a perspective view of a preferred form of this invention showing a particular gage configuration providing additional advantages.

FIG. 4 shows a preferred modification of this invention and presents a convenient and advantageous construction of a full-bridge gage having four arms self-compensating against ambient atmospheric changes and problems connected with differential thermal expansion similar to those discussed in connection with FIGS. 1 and 2. In FIG. 4 the gage, indicated generally by 45, is made up of arms 46, 47, 48 and 49 each of which in this particular case being of equal dimensions. The entire configuration is preferably cut from a single crystal of semiconductor material. The corners of the square configuration carry electrical contacts 50, 51, 52 and 53 of which 51 and 53 are connected through variable resistor 55 across galvanometer 54 and 50 and 52 are connected to direct-current power source 56. The gage 45 is glued or otherwise affixed to member 57 in which the stresses are to be measured. The arms 46–49 are cut from the crystal such that orientations providing opposite piezoresistive coefficients in adjacent arms responsive to a given directional stress are obtained. Here again, since all arms are of a single crystal, two opposite arms exhibit positive $\pi_l$ values while the remaining opposing pair have negative $\pi_t$ values (or vice versa). All of the orientations apearing in Table I achieve this end. The designations arm 1 and arm 2 in Table I are considered as adjacent arms, for example, 46 and 47 in FIG. 4. Thus, according to this construction, four active gage arms are utilized each contributing an amount comparable to the sensitivity of a conventional piezorestrictive type strain gage employing a single active arm.

Consider a particular gage constructed of n-type silicon according to the configuration of FIG. 4 and having the crystallographic orientation as set forth in Example 1 of Table I. For this material and orientation $\pi_l$ is approximately $-100 \times 10^{-12}$ cm.$^2$ per dyne and $\pi_t$ is approximately $+50 \times 10^{-12}$ cm.$^2$ per dyne. The voltage response $\Delta V$ in a stress gage for a given stress, $\sigma_l$, parallel to one direction of the square, is given by the following:

$$\Delta V = (\pi_t - \pi_l) I R \sigma_l \qquad (9)$$

where R is the resistance of an arm (assume the same for all arms), I is the current in each arm, $\pi_l$ and $\pi_t$ are the same as previously defined. For the values given above for $\pi_l$ and $\pi_t$ Equation 1 becomes:

$$\Delta V = 150 \, I R \sigma_l$$

This is three times the voltage response obtained by a conventional gage having one active arm (assuming it utilizes $\pi_l$ and a coefficient of $-100$).

As discussed previously, since this gage utilizes not only arms which add voltages but also those which measure voltage differences, all influences which affect the resistance of each arm equally will not appear in the gage reading. This is because two such influences add whereas two subtract giving a net of zero. Since in this particular embodiment each arm is essentially identical, each will necessarily show equal resistance changes with temperature, pressure, etc. Strains introduced in the gage through differential thermal expansion between the gage material and an isotropic base material also will not appear in the gage reading.

It has been pointed out that the square gage of FIG. 4 is inherently compensated against changes in resistance of the arms with temperature. However, the gage factor, which is proportional to the piezoresistance coefficient, $\pi$, may change with temperature. For lightly or moderately-doped Ge or Si, $\pi$ varies as $1/T°K$ (except in certain critical ranges to be described).

It has been shown by W. P. Mason, and embodied in W. P. Mason, Serial No. 47,692, filed August 5, 1960, now United States Patent No. 3,102,420, issued September 3, 1963, that silicon containing about $10^{20}$ boron atoms/cm.$^3$ is p-type and has a gage factor that varies by only about $\pm 4\%$ between $+200°$ C. and $-50°$ C. The mean value of the gage factor is about $+60$ in [111] direction as compared with about 175 for lightly-doped silicon.

A second approach to obtaining a constant voltage output from the square gage, or an ordinary semiconducting gage, is to: (a) Operate the gage at constant current, and (b) use a material whose resistivity varies with temperature inversely as the gage factor varies. For example, for a gage factor that varies as $1/T°K$, a material whose resistance varies as $T°K$ is required. A composition which exhibits approximately the correct behavior is germanium containing about $3.0 \times 10^{14}$ atoms/cm.$^3$ of Sb, P or As. For materials near this composition, the decrease in mobility of electrons and holes with rising temperature is offset by the increase in intrinsic carrier concentration in such a way that a resistivity versus temperature law is approximated between about $0°$ C. and $200°$ C. The mean value of the gage factor, $\pi_l$, is large, about 150 in the [111] direction.

Since an unexpected and advantageous result of this invention resides largely in its inherent compensation against these troublesome variables, a further modification of this embodiment is presented wherein only two of the arms are active in terms of providing increased gage factors. Such a bridge employs two opposing arms having relatively large piezoresistive coefficients, while the piezoresistive coefficient of the remaining two arms may be approximately zero. Thus, such a gage provides gage factors which are essentially twice the factors of the usual single arm gage but, even more significantly, provides for all the compensations against variations in gage readings which are obtained in the previous embodiment. Since the demands on the crystal orientations are reduced in this modification, more are available. In this embodiment it is deemed sufficient that the coefficient in adjacent arms differs by a value of at least 50 and preferably 100.

The directional sensitivity of this device is another significant feature of this invention. For strains having the direction designated Z in FIG. 4, which is at 45° to the arm directions, the gage is insensitive. This is due to the fact that such strains influence each arm in the same manner, that is, each arm is stretched longitudinally and transversely to the same degree. Consequently, differences in longitudinal and transverse elastoresistive coefficients cannot be utilized. However, strains having the directionality indicated by Y in FIG. 4 have essentially the same effect as those having direction X (except for a reversal in sign of $\Delta V$). Thus, from an initial reference axis, along which strains are effectively measured, a rotation of the axis to 45° removed results in a zero gage reading; a rotation to 90° in either direction results in effective measurement of strains normal to the original reference axis with a reversal of sign of the galvanometer voltage. Accordingly, this device, without adjustment or modification can read separate strains in two directions and can further record the differential between simultaneous biaxial strains where each is tension or compression or the total of two biaxial strains where one is tension and the other compression. However, inasmuch as shearing stresses in direction Z and normal to Z in the gage plane can be resolved into normal stresses in directions X and Y, the gage of FIG. 4 is admirably suited for measuring such shears. In contrast to full-bridge arrangements of conventional gages, in the gage of FIG. 4 both the longitudinal and transverse components of the shears are additive in each arm in such a manner as to provide double the voltage response for a bridge made up of conventional gages that do not have transverse sensitivity.

This embodiment has been depicted as a flat, square sheet of piezoresistive material. It is apparent, however, that the square configuration is not essential to obtain the proper functioning of the gage as previously defined. For instance, the gage may assume a flat rectangular shape or the shape of a flat parallelogram. Accordingly, the configuration intended to be covered by this embodiment is most aptly termed a parallelepiped having a hollow interior extending through its thickness. Due to the difficulties in obtaining a balanced bridge in a rectangular bridge and the problem of matching the response of each arm to ambient variations, it is preferred that the ratio of length to width does not exceed three.

In the event that rectangular shapes are employed in either of the embodiments above, and arms of different size or even materials are to be used, it is essential if compensation against other influences such as those previously discussed is desired, that the ratio of the resistance of arm 46 to arm 49 vary as the ratio of arm 47 to arm 48 in response to the variable against which compensation is desired. Consequently, since matching various coefficients of arms of different materials and sizes is troublesome and impractical a gage formed from a single crystal having arms of the same length and cross section is most advantageous. Rectangular gages also suffer the disadvantage of unequal variation of arms with ambient condition unless the arms are so chosen in material and dimension to counteract for this.

Various uses of this gage configuration are available aside from that depicted in FIG. 4. For example, the gage may be used as a tensiometer in a manner similar to that of FIG. 3 by replacing the T with the square configuration. Also, the gage may be used as a compressive load cell by applying pressure normal to the principal plane of the gage. A useful orientation for this application for n-Ge, p-Ge, p-Si and n-Si is to have plane of gage the (110) plane, with arms parallel to [001] and [1$\bar{1}$0] directions. For this orientation, pressure or tension normal to the plane of the gage causes adjacent arms to change in resistance by different amounts. For n-Si the changes are opposite; for the others the change in the [001] arm is close to zero.

Figure 5:
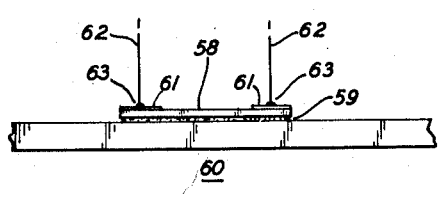
FIG. 5 is a front elevation of the gage of FIG. 4 showing exemplary relative dimensions and illustrating contacts appropriate for use in all of the devices described herein.

FIG. 5 shows a front elevational view of the gage of FIG. 4 which is presented primarily to illustrate the preferred relative thinness of the gage and a typical manner in which leads may be affixed. The gage, indicated generally at 58, is affixed to the base 60 in which strains are to be measured by appropriate means such as glue 59. At each corner of the configuration a metal alloy layer 61 covers the corner and the leads 62 are attached to the corner by solder dots 63.

Some attention should be given to the relative dimensions of the arms in each of these gage configurations. Of course, where the gage is to be used as in FIG. 3 the relative cross section dimensions are not of consequence. However, it is well known that to obtain an easily detected piezoresistive effect in a gage affixed to a member in which strains are to be measured, a thin gage cross section is desirable. Accordingly, it is preferred for this invention that if the gage is to be affixed to another member in which strains are introduced the thickness of the gage member should not exceed one-tenth and preferably one-twentieth of the dimension parallel to the strain to be measured.

Various other configurations and modifications utilizing the principles as set forth herein will become apparent to those skilled in the art. However, all such deviations which basically employ the novel concepts by way of which this invention has advanced the art are considered within the scope of this invention as defined by the appended claims.

What is claimed is:

1. A piezoresistive stress gage comprising at least two active arms of the same piezoresistive semiconductor material and having the same conductivity type, said arms crystallographically oriented in a single gage plane so that for a given single strain direction the piezoresistive coefficient of one of said arms is opposite in sign to the piezoresistive coefficient of the other of said arms, and a Wheatstone bridge circuit containing each of said arms as an active bridge arm in a bridge relation such that the Wheatstone bridge indicates the difference in voltage drops across said arms.

2. The gage of claim 1 wherein each active arm is joined together in the shape of an L each arm having approximately the same dimensions, and the entire shape comprising a single crystal.

3. A piezoresistive stress gage comprising four active arms of the same piezoresistive semiconductor material and having the same conductivity type, each of said arms being crystallographically oriented in a single gage plane so that for a given single strain direction the piezoresistive coefficient for a first pair of said arms is opposite in sign to the piezoresistive coefficient of the other pair of said arms and a Wheatstone bridge circuit containing each of said arms as an active bridge arm in a bridge relation which indicates the difference between the sum of the voltage drops across the first pair of said arms and the sum of the voltage drops across the other pair of said arms.

4. The gage of claim 3 wherein each arm has the same dimensions.

5. The gage of claim 3 wherein the length of each arm in the direction in which the strain is to be measured is at least ten times the thickness of the gage arm.

6. A piezoresistive stress gage comprising a flat sheet of a single crystal of piezoresistive material having a parallelepiped shape, said sheet having a hollow interior portion extending through the said flat sheet whereby four elongated arms remain, each of two opposing arms having a longitudinal piezoresistive coefficient which differs by a value of at least $50 \times 10^{-12}$ cm.$^2$/dyne from the transverse piezoresistive coefficient of the adjacent arms and four electrical leads, one attached to each corner of said sheet, said leads being connected in a Wheatstone bridge circuit such that the Wheatstone bridge indicates the difference between voltage drops across adjacent arms.

7. The strain gage of claim 6 wherein the said longitudinal coefficient is opposite in sign from the said transverse coefficient.

8. The strain gage of claim 6 wherein the flat sheet has a parallelepiped shape such that the thickness does not exceed one-tenth of the shortest remaining dimension and the hollow interior portion extends through the thickness.

9. The strain gage of claim 8 wherein the two remaining dimensions have a ratio of lengths which does not exceed 3.

10. The strain gage of claim 6 wherein the configuration is essentially a flat square with a hollow concentric square interior portion.

11. The strain gage of claim 6 wherein the piezoresistive material is silicon.

12. The strain gage of claim 6 wherein the piezoresistive material is germanium containing approximately $3.0 \times 10^{14}$ atoms/cc. of an impurity selected from the group consisting of arsenic, phosphorus and antimony.

13. The strain gage of claim 6 wherein the gage material is n-silicon, the crystallographic plane of the gage is (001) and the crystallographic orientations of opposing arms are [100] and [010] respectively.

14. The strain gage of claim 6 wherein the gage material is selected from the group consisting of n-germanium, p-germanium and p-silicon, the crystallographic plane of the gage is (100) and the crystallographic orientations of opposing arms are [110] and [1$\bar{1}$0] respectively.

15. The strain gage of claim 6 wherein the gage material is selected from the group consisting of n-germanium, p-germanium and p-silicon, the crystallographic plane of the gage is (11$\bar{2}$) and the crystallographic orientations of opposing arms are [111] and [1$\bar{1}$0] respectively.

16. The strain gage of claim 6 wherein the gage material is selected from the group consisting of n-germanium, p-germanium and p-silicon, the crystallographic plane of the gage is (1$\bar{1}$0) and the crystallographic orientations of opposing arms are [111] and [11$\bar{2}$] respectively.

References Cited by the Examiner
UNITED STATES PATENTS

| | | | |
|---|---|---|---|
| 2,621,276 | 12/52 | Howland | 73—88.5 X |
| 2,939,317 | 6/60 | Mason | 73—88.5 X |
| 3,049,685 | 8/62 | Wright | 73—88.5 X |

OTHER REFERENCES

Herring, Conyers, "Transport Properties of a Many-Valley Semiconductor," Bell System Technical Journal, vol. 34, No. 2, March 1955, pages 237 to 290, pages 251 to 258 relied on.

RICHARD C. QUEISSER, *Primary Examiner.*

CHARLES A. CUTTING, DAVID SCHONBERG,
*Examiners.*